Feb. 10, 1970 H. KOPP 3,495,188
SINGLE-SIDEBAND CARRIER FREQUENCY SYSTEM UTILIZING
A PREMODULATION STAGE FOR PROVIDING THE
BASE PRIMARY GROUP
Filed May 23, 1966 3 Sheets-Sheet 1

INVENTOR
Hans Kopp
BY Spiel & Spiel
ATTYS.

Feb. 10, 1970 H. KOPP 3,495,188

SINGLE-SIDEBAND CARRIER FREQUENCY SYSTEM UTILIZING A PREMODULATION STAGE FOR PROVIDING THE BASE PRIMARY GROUP

Filed May 23, 1966 3 Sheets-Sheet 2

INVENTOR
Hans Kopp
BY Stiee+Stiee
ATTYS.

Feb. 10, 1970 H. KOPP 3,495,188

SINGLE-SIDEBAND CARRIER FREQUENCY SYSTEM UTILIZING A PREMODULATION STAGE FOR PROVIDING THE BASE PRIMARY GROUP

Filed May 23, 1966 3 Sheets-Sheet 3

INVENTOR
Hans Kopp
BY [signature]
ATTYS.

United States Patent Office 3,495,188
Patented Feb. 10, 1970

3,495,188

SINGLE-SIDEBAND CARRIER FREQUENCY SYSTEM UTILIZING A PREMODULATION STAGE FOR PROVIDING THE BASE PRIMARY GROUP

Hans Kopp, Munich, Germany, assignor to Siemens Aktiengesellschaft, a corporation of Germany Filed May 23, 1966, Ser. No. 552,160
Claims priority, application Germany, May 24, 1965, S 97,264
Int. Cl. H03c 3/02
U.S. Cl. 332—23 6 Claims

ABSTRACT OF THE DISCLOSURE

A single-sideband carrier freqcency system, in which the base primary group 60 to 108 kHz. is built up over a premodulation band that lies below the base primary group, in which system the carrier frequencies for the conversion from the premodulation into the base primary group band lie outside of and above the base primary group, the channel filters being mechanical filters which preferably contain bending oscillators with longitudinal coupling.

This invention relates generally to a twelve-channel single-sideband carrier frequency system having a premodulation stage, primarily for developing a base primary group of 60–108 kilocycles, and more particularly to such a system employing mechanical channel filters for filtering out the premodulation band.

The frequency plans of most single-sideband carrier frequency systems with twelve or more channels are based on the base primary group 60 to 108 kilocycles recommended by the CCITT (Comitê Consultatif International Téléfonique et Télégrafique), in which the frequency bands of twelve speaking channels are arranged adjacent one another in lower sideband position. Three types of modulation may be employed for converting to this base primary group: direct modulation, pregroup modulation, and premodulation.

In direct modulation, the twelve low-frequency speaking bands are converted by means of twelve different carrier frequencies and twelve different channel filters in a single modulation stage directly into the range of the base primary group. This type of modulation generally requires the fewest structural parts, but also requires a greater number of different types of channel filters. In addition, extremely high demands are placed on the flank steepness of the attenuation characteristics of the channel filters, for which reason oscillating crystals are usually employed as the filtering means. Moreover, these crystal filters assure a high degree of temperature constancy and exhibit a relatively long life. It has also been proposed to replace the crystal filters with mechanical filters in the direct modulation systems.

The pregroup type of modulation is a highly economical process. In the first modulation stage of the pregroup type of modulation, four 3-channel pregroups in the range 12 to 24 kilocycles are employed, the products of which, in the second modulation stage, are converted into the range of the base primary group. The number of different types of filters in the pregroup type of modulation is reduced to three high-value channel filters, which have a high value of discrimination, and four considerably simpler group filters. Also, in the pregroup modulation system, only seven carrier frequencies are required. A relatively low frequency range of the pregroup band of 12 to 24 kilocycles makes possible a very favorable dimensioning of the channel filters in the conventional construction employing coils and capacitors. It has also been proposed to use mechanical filters instead of coil filters in the prescribed frequency range, which mechanical filters contain bending resonators with longitudinal coupling. Such mechanical filters have the advantage of reducing interfering spurious waves.

Before the introduction of the pregroup type of modulation into the industry, the process of premodulation was known, in which the low-frequency bands in the premodulation are brought into one and the same frequency position and then, in the second modulation stage are brought into the range of the base primary group. The choice of the premodulation position depends largely on the channel filter employed. The premodulation position is chosen, so far as possible, relatively high so that in the second modulation it is possible to employ a common group filter. A comparison of the three processes in the table shows that the fewest number of different types of filters is needed in the premodulation system. That is, only one type of channel filter is required, which is a high-discrimination, high-value channel filter, and only one group filter is needed. However, in the premodulation system a greater number of carrier frequencies and modulators is required.

TABLE

| | No. of types of channel filters | No. of types of (pre-) group filters | No. of carrier frequencies | No. of modulators |
|---|---|---|---|---|
| Direct modulation | 12 | | 12 | 12 |
| Pregroup modulation | 3 | 4 | 7 | 16 |
| Premodulation | 1 | 1 | 13 | 24 |

Through the introduction of mechanical channel filters into carrier frequency systems, the process of premodulation has recently again acquired considerable importance. This is primarily due to the fact that such filters can be manufactured by fully automatic processes, since only a single high-quality channel filter type is required. The invention has as one of its underlying objectives that of finding an optimal position of the premodulation band, under consideration of the special requirements which mechanical filters fulfill. Furthermore, there should be employed a type of filter which assures the small dimensions and a deficiency in the spurious waves and is suited for automatic manufacture.

According to one feature of the invention, the frequency position of the premodulation band is so selected that in such position from which it is converted it lies below the basic primary group and the twelve carrier frequencies necessary in the second modulation stage lie above the base primary group and in which mechanical channel filters are employed for filtering out the twelve premodulation bands and a common group filter is employed for filtering out the base primary group.

In a carrier frequency system with a 4 kc. bandwidth, which is the generally accepted value of present times, the carrier frequencies are chosen to especial advantage in such a way that they are whole-numbered multiples of 4. According to a further feature of the invention, therefore, for the construction of the base primary group there are expediently used the following carrier frequencies: a premodulation carrier of 48 kc., so that there is yielded a premodulation band in a position of 48 to 52 kc., and as channel carriers in the second modulation stage the twelve frequencies 112, 116 . . ., 156 kc.

The frequency scheme thus created for the arrangement of the base primary group can be designated as optimal under the given conditions: the frequency position of the channel filter below the base primary group in the zone around 50 kc. yields lower requirements for the flank steepness of the attenuation characteristics and lower requirements for the manufacturing precision and the aging and temperature coefficients of the material than is the case in which the frequency position is above the base primary group. In the second modulation stage the carrier residues do not fall in the useful band of 60 to 108 kc. Moreover, the undesired higher modulation products, which contain multiples of the carrier lie far above the useful band. On the group filter which is in common for all the channels only slight demands are made.

Mechanical channel filters which are especially suited for such application are those which contain bending oscillators as resonators. Through a suitable coupling of adjacent bending oscillators over longitudinally oscillating elements which preferably engage in an oscillation maximum on the resonators, troublesome side waves can be largely avoided. The attenuation poles necessary for the steepening of the filter characteristic flanks can be achieved by mechanical and/or electrical overcouplings—i.e., couplings between non-adjacent filter elements. Such filters are the subject of older German patent applications (file references S 81,418; S 92,017 and S 92,781).

According to another further feature of the invention the premodulation carrier 48 kc. and the twelve channel carriers 112, 116 . . ., 156 kc., are derived from a single 4-kc. base frequency in such a way that first through multiplication of the base frequency there are formed the auxiliary frequencies 12 and 20 kc. Through multiplication of the auxiliary frequency 12 kc. there are obtained the carrier frequencies 48, 120, 132 and 144 kc. The still missing carrier frequencies are obtained by mixing (addition or subtraction) of 12 kc. multiples among one another or with the auxiliary frequency 20 kc. Through such an arrangement of the carrier supplying the demands on the selectivity of the filters filtering out the carriers are lower than in the case of generation of the carriers in a single group from multiples of the base frequency 4 kc., or in two separate groups from even-numbered and odd-numbered multiples of the base frequency. The distance apart of the adjacent frequencies to be suppressed amounts in the carrier frequency filters lying in the range of 112 to 156 kc. in the arrangement according to the invention to at least 12 kc., while otherwise it would amount only to 4 or 8 kc.

The invention will be more fully realized and understood from the following detailed description when taken in conjunction with the accompanying drawings wherein.

Figure 1:
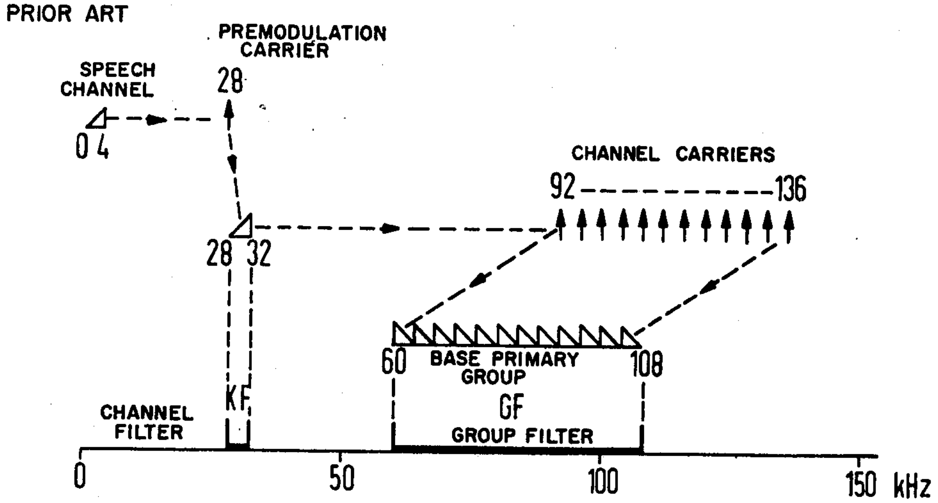
FIGURE 1 is a frequency spectrum and illustrates one arrangement for producing a base primary group in accordance with one known modulation system.
Figure 2:
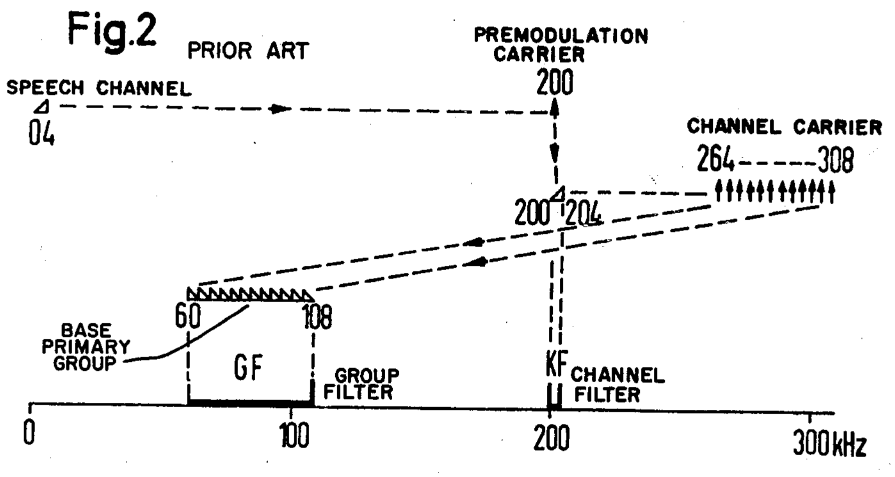
FIGURE 2 is a frequency spectrum which illustrates another arrangement for producing a base primary group in accordance with another known modulation system.

With reference to FIGURES 1 and 2, there are shown two arrangements for producing a base primary group by the premodulation approach. In the premodulation type, the frequency position of the premodulation band can be chosen below or above the base primary group. As low as possible a position of the premodulation band below the base primary group is expedient in the case of the use of conventional channel filters with coils and capacitors. For example, FIGURE 1 shows the arrangement of the basic primary group in a carrier frequency system known in the prior art as the CV–240 of the RCA Company. In the frequency plan of FIGURES 1, 2 and 3, the pass ranges of the required filters—the channel filter KF and the common group filter GF—are indicated by thick lines on the abscissa and the numbers designate the frequencies in kilocycles. In the arrangement illustrated in FIGURE 1 after conversion with the premodulation carrier 28 kc. the speech bands lie in the range 28 to 32 kc., from which they are converted by the twelve channel carriers 92, 96 . . ., 136 kc. into the range of the base primary group. As shown in FIGURE 1, one major disadvantage is that the unmodulated carrier components which remain after the modulation of the five lower channel carriers fall into the useful band. If these unmodulated carrier components are to be further suppressed, then expensive compensation circuits are necessary, which are difficult to maintain stable over a relatively large temperature range without special carrier component filters.

In the investigations on mechanical channel filters a filter type was found which is especially well suited for a frequency range between about 100 and 300 kc. This led to a frequency plan according to FIGURE 2, which is described in the article "Mechanical Filters for Carrier Frequency Technology" by Börner (NTF 19–1960, pp. 34–37). Through premodulation with the carrier 200 kc. there is produced the band 200 to 204 kc., which, by means of the twelve carriers 264, 268 . . . , 208 kc., is converted into the range of the base primary group. A suitable channel filter for such an arrangement is a torsion filter with longitudinal coupling. Such a high frequency position around 200 kc. requires an extremely great flank steepness of the attenuation characteristics of the filter, a very small temperature coefficient of the mechanical resonators and a very high precision of manufacture.

Figure 3:
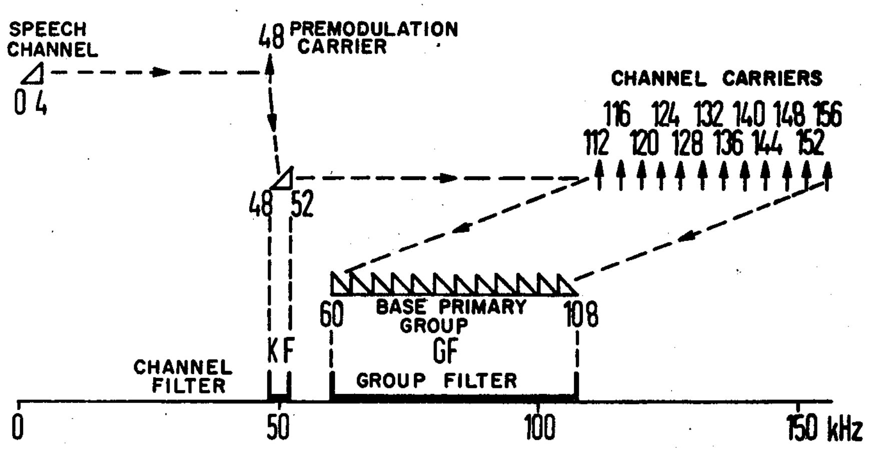
FIGURE 3 is a frequency spectrum illustrating the arrangement according to the present invention for producing a base primary group.
Figure 4:
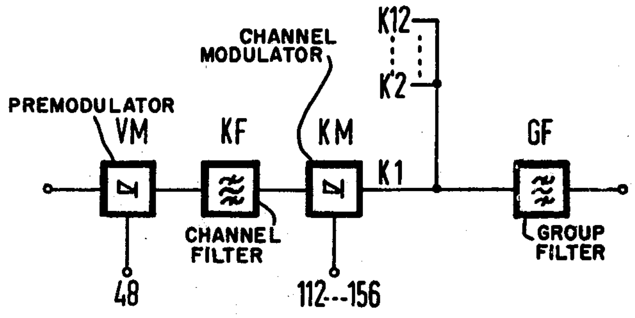
FIGURE 4 is a schematic block diagram illustrating a system for producing the base primary group constructed in accordance with the principles of the present invention.

The conversion of the twelve speech bands from the low-frequency position into the range of the base primary group in two stages in each case can be easily followed with the aid of the frequency plan of FIGURE 3 and the schematic block diagram of FIGURE 4. Underlying the frequency plan is a single-sideband carrier frequency system with 4 kc. bandwidth, with the speech band to be transmitted extending from 300 to 3400 cycles. The block diagram of FIGURE 4 shows only the modulators and filters essential for the frequency conversions and is the same both for the construction of the base primary group (sending direction from left to right) and also for their resolution (receiving direction from right to left).

The low-frequency speech band in the range of 0 to 4 kc. is first converted in a premodulator VM with a premodulation carrier of 48 kc. A mechanical channel filter KF has the function of passing the upper sideband in the range of 48 to 52 kc. and blocking the lower sideband in the range of 44 to 48 kc. The demands on the steepness of the lower flank of the attenuation characteristics of the channel filter are established by the fact that this flank must rise within the range of 48.3 to 47.7 kc. from very nearly 0 up to at least 60 db (6.9 Np).

The premodulation band in the range of 48 to 52 kc. is then supplied to a channel modulator KM and there converted according to each channel with one of the twelve channel carriers 112, 116 . . . , 156 kc. The outputs K1 to K12 of the twelve channel modulators KM are connected together so that the twelve lower sidebands in the range of the base primary group extending from 60 to 108 kc. lie next to one another in frequency, while the undesired upper sidebands occupy the range of 160 to 208 kc. If desired, the outputs K1 to K12 may be connected together through decouplers. A group filter GF is connected in common to all the channels and passes only the useful bands of 60 to 108 kc. The filter GF is dimensioned in such a way that it blocks, for example, the components of the premodulation band of 48 to 52 kc. which remain afer the modulation process because of any deficient symmetry of a double push-pull channel modulator, as well as the carrier components of the channel carrier lying above 112 kc. and also suppresses the undesired upper sidebands. The group filter GF, which, because of its relatively great bandwidth, is constructed expediently of coils and capacitors, and may consist of a band pass or of a combination of several filters, for example, bandpass and bandblock.

Figure 5:
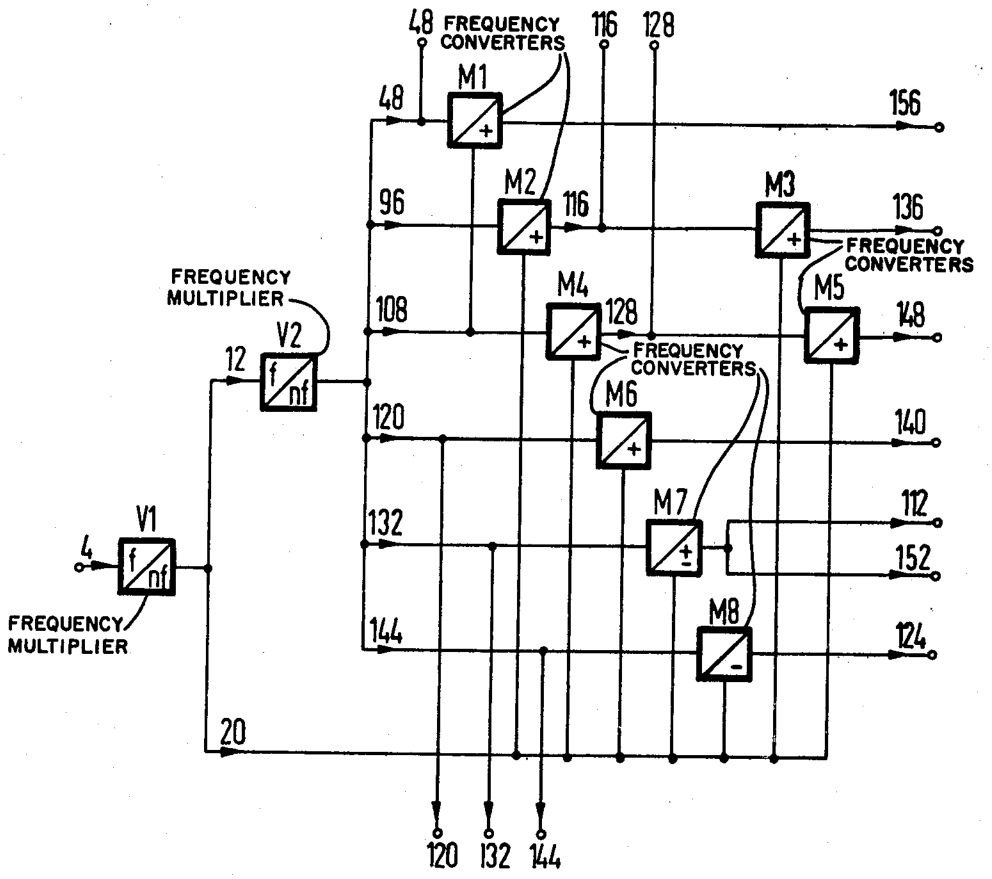
FIGURE 5 is a schematic block diagram illustrating a system for producing the carrier frequency signals employed in the system shown in FIGURE 4.

The derivation of the premodulation carrier frequency 48 kc. employed in the circuit of FIGURE 4 and of the twelve channel carrier frequencies from one high-constancy 4 kc. base frequency is achieved by the circuit schematically shown in FIGURE 5. Two frequency multipliers V1 and V2 and eight frequency converters M1 to M8 are required. In the frequency converters a plus or minus sign at the output indicates whether it is the summing or differential frequency that is filtered out. In detail, the arrangement operates as follows:

From the base frequency 4 kc. as an input to the multiplier V1 are produced the auxiliary frequencies 12 and 20 kc. as 3rd and 5th harmonics. The multiplication of the auxiliary frequency 12 kc. in the multiplier V2 yields the desired carrier frequencies 48, 120, 132 and 144 kc. (as 4th, 10th, 11th and 12th harmonics) and the auxiliary frenquencies 96 and 108 kc. (as 8th and 9th harmonics). Through mixing (addition) of the carrier frequency 48 kc. with the auxiliary frequency 108 kc. in the frequency converter M1 the carrier frequency 156 kc. is produced. From the auxiliary frequency 96 kc. and the auxiliary frequency 20 kc. through two successive mixings (additions) with the auxiliary frequency 20 kc. in the frequency converters M2 and M3 the carrier frequencies 116 and 136 kc. are produced. From the auxiliary frequency 108 kc. and two successive mixings of the auxiliary frequency 20 kc. there are formed in the frequency converters M4 and M5 the carrier frequencies 128 and 148 kc. Through mixing (addition or subtraction or both) of the auxiliary frequency 20 kc. with the carrier frequencies 120, or 144, or 132 kc. in the frequency converters M6, or M8, or M7 respectively there result, finally, the carrier frequencies 140, 124, 152 and 112 kc. respectively. Each of these resultant frequency signals are employed in the circuit of FIGURE 4.

It will be understood that modifications and variations may be effected without departing from the scope of the novel concepts of the present invention.

The invention claimed is:

1. A single-sideband carrier frequency system for converting a plurality of speech signals in a speech band to a base primary group band comprising a plurality of premodulation stages each having a respective one of the speech signals connected to an input thereof and disposed for converting each speech signal from the respective speech band to a premodulation band intermediate the speerh band and the base primary group band and relatively closely adjacent to the lower end of the latter band, a plurality of channel filters each connected to said premodulation stages, each of said channel filters being mechanical channel filters, and a plurality of modulators, each having an input connected to a respective one of said filters and each having a carrier frequency outside of and above the base primary group band for converting each input connected thereto to the base primary group band, and a group filter connected to the outputs of said modulators.

2. The single-sideband carrier frequency system as defined in claim 1 wherein said mechanical channel filters include bending resonators, and wherein adjacent resonators of each filter are coupled over longitudinally vibrating elements.

3. The single-sideband carrier frequency system as defined in claim 1 including means for producing a carrier frequency signal for each of said premodulation stages and a carrier frequency signal for each of said modulators, with each of said carrier frequency signals being whole number multiples of a base frequency.

4. The single-sideband carrier frequency system as defined in claim 3 wherein said carrier frequency signal producing means includes means for producing first auxiliary frequency signals of 12 and 20 kc. from a 4 kc. signal input, means for multiplying the auxiliary frequency signal of 12 kc. to produce carrier frequency signals of 48, 120, 132, and 144 kc. and second auxiliary frequency signals of 96 and 108 kc., means for mixing the auxiliary frequency signals of 20, 96 and 108 kc. and the carrier frequency signals of 120, 132, and 144 kc. to produce carrier frequency signals of 112, 116, 124, 128, 140, and 152 kc., means for mixing the carrier frequency signals of 116 and 128 kc. with the auxiliary frequency signal of 20 kc. to produce a carrier frequency signal of 148 kc., means for mixing a carrier frequency signal of 48 kc. with the auxiliary frequency signal of 108 kc. to produce a carrier frequency signal of 156 kc., and means for applying each of said carrier frequency signals to a respective one of said modulators.

5. The single-sideband carrier frequency system as defined in claim 1 wherein the speech band is in a range of 0–4 kc., the carrier frequency of each of said premodulation stages is 48 kc., said channel filters being bandpass filters having a bandpass of 48–52 kc., and the carrier frequencies of said modulators are 112, 116, 120, 124, 128, 132, 136, 140, 144, 148, 152, and 156 kc.

6. The single-sideband carrier frequency system as defined in claim 5, wherein said group filter connected to the outputs of said modulators has a bandpass of 60–108 kc.

References Cited

UNITED STATES PATENTS

| | | | |
|---|---|---|---|
| 2,261,778 | 11/1941 | Reid. | |
| 2,270,385 | 1/1942 | Skillman | 332—40 X |
| 3,342,941 | 9/1967 | Kondo | 325—50 X |

OTHER REFERENCES

Philips Technische Rundschau, 1947, pp. 161–171, 9 Jahrgang, No. 6.

ALFRED L. BRODY, Primary Examiner

U.S. Cl. X.R.

179—1, 15; 325—50, 137; 332—22, 45; 333—70